A. M. ROSWELL.
STRAINER.
APPLICATION FILED JULY 17, 1916.

1,206,471.

Patented Nov. 28, 1916.

WITNESSES
Roland Williams.
S. Pribula

INVENTOR
Anna M. Roswell
BY Richard Owen.
ATTORNEY

ANNA M. ROSWELL, OF ELMSFORD, NEW YORK.

STRAINER.

1,206,471.

Specification of Letters Patent.

Patented Nov. 28, 1916.

Application filed July 17, 1916. Serial No. 109,708.

*To all whom it may concern:*

Be it known that I, ANNA M. ROSWELL, a citizen of the United States, residing at Elmsford, in the county of Westchester and State of New York, have invented certain new and useful Improvements in Strainers, of which the following is a specification.

My invention relates to strainers, and more particularly, to an attachment for coffee and tea pots, whereby the fluid will be strained as it is poured from the pot.

The invention has more especial reference to the novel construction and arrangement of the device, the same being so constructed as to permit it to be readily attached to the pot, interiorly thereof and adjacent the spout, and will be securely held in proper position, irrespective of the tilting during the pouring operation.

Another important characteristic of the invention resides in the peculiar formation of the straining attachment, which is so constructed as to cause the fluid to be directed to the pouring spout, consequently preventing the same from flowing toward the top of the pot, thus eliminating any possibility of spilling the contents or scalding the user.

The invention also aims to provide an attachment of the character mentioned, which will be exceedingly simple in construction, which may be readily detached for cleaning, and finally, an article which provides novel details in the construction and arrangement of the several parts with a view to higher efficiency generally.

All the foregoing, together with additional advantageous details and arrangements of parts of the preferred embodiment of my invention, will be clear from the specific description hereinafter contained, when read in connection with the accompanying drawings forming a part thereof, wherein said embodiment of the invention is illustrated for the purpose of facilitating a full understanding of the present improvements.

Figure 1:
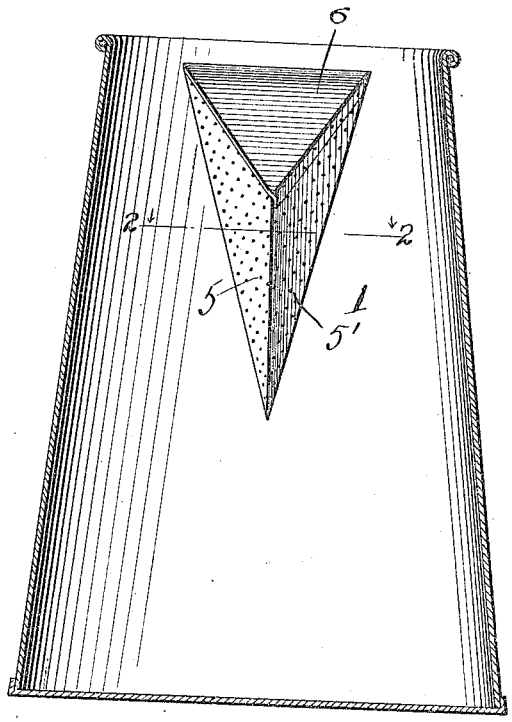
Figure 2:
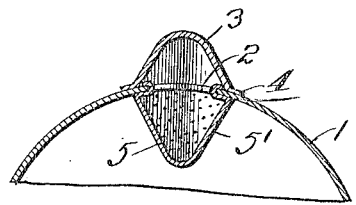
Figure 4:
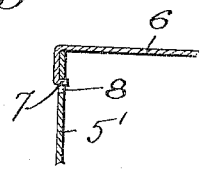
Figure 3:
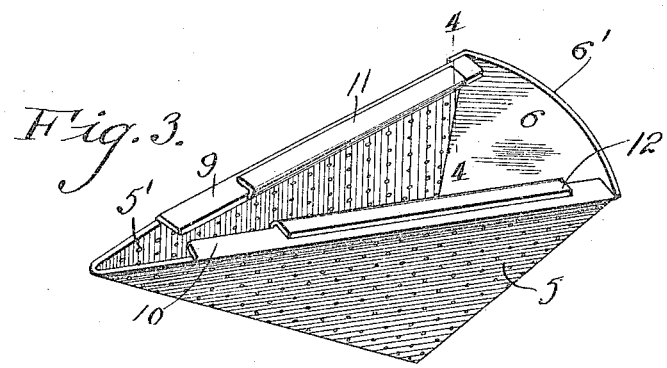

In the drawings Figure 1 is a vertical section taken through a pot with my improved attachment applied; Fig. 2 is a fragmental transverse section taken on the line 2—2 of Fig. 1; Fig. 3 is a perspective of the improved strainer and Fig. 4 is a fragmental section taken on the line 4—4 of Fig. 3.

Referring now more particularly to the drawings, wherein like reference numerals refer to corresponding parts throughout the several views, it may be stated that the device may be used in conjunction with any form of coffee or tea pot, wherein the edges thereof as bordering the opening to which the spout is mounted adjacent, are distended, thus providing for means whereby the improved attachment may be applied.

For the purpose of illustration, I have disclosed a pot of the character stated, which is indicated by the numeral 1, having an opening 2 formed in one side thereof, which opening is arranged adjacent the usual pouring spout 3, the same being provided with laterally distended flanges 4, whereby the said spout may be secured to the walls of the pot. With more especial reference to the present improvement, I provide a blank of bendable sheet metal, which is so formed as to constitute a substantially V-shaped body and has the side walls thereof perforated to provide for the necessary straining means. These perforated walls are indicated by the numerals 5 and 5'. The remaining portion of the blank is then bent diagonally along the upper portion of the wall 5 and has a portion thereof adjacent its outer edge bent downward substantially at right angles to the top portion thereof, whereby the same will simply overlap the upper portion of the perforated side wall 5'. It will be thus seen, that a solid top wall 6 is provided and serves as means whereby the fluid contents of the pot will be directed into the pouring spout, and will prevent the same from flowing toward the top of the receptacle, thus, eliminating the spilling thereof, or the scalding of the user. A catch 7 is struck outwardly from a portion of the right angularly disposed flange as formed upon the top wall 6 and is received within an opening 8 arranged in the perforate wall 5' and adjacent to the former and affords means whereby said top 6 will be held in engagement with the upper portions of the perforate walls 5 and 5'.

Oppositely disposed laterally distended flanges 9 and 10 are arranged upon the side marginal edges of the perforate walls 5 and 5' and carry thereon angularly engaging pieces 11 and 12, it being noted that the said engaging pieces comprise arms formed integral with the said flanges 9 and 10 and are bent backwardly upon themselves parallel to their respective flanges. By so constructing these engaging pieces 11 and 12, it will be obvious, that the same provide means whereby the edges of the pot as bordering the opening 2 may be engaged and serve as means for supporting the strainer attachment. It will be also noted that the flanges 9 and 10 do not extend throughout the entire length of the said marginal edges of the perforate walls 5 and 5' but merely for a portion thereof; also, that the engaging pieces 11 and 12 are somewhat shorter than their respective flanges 9 and 10. By forming the flanges 9 and 10 in the manner as above described, it will be evident that a portion of the strainer, as constituted by the perforate walls 5 and 5', will overlap the lower portion of the opening 2, thus, preventing any of the fluid as contained within the pot to pass therethrough without being strained; further, that the engaging pieces 11 and 12 by being of less length than their respective flanges 9 and 10 may be much more readily engaged with the marginal edges of the opening 2.

In applying the improved strainer, the engaging pieces 11 and 12 as above stated are engaged with the edges of the pot as bordering the opening 2 and, due to the tapering formation of this opening, it will be obvious that when the strainer is moved downwardly, the said engaging pieces 11 and 12 will bind upon the edges and thus be securely held in position. The outer edge of the solid wall 6 is preferably rounded as is 6' so that the same will snugly engage with that portion of the pot adjacent thereto and thereby prevent the leakage of fluid therebetween. In pouring, the fluid will be passed through the perforate walls 5 and 5' and directed by means of the solid top 6 into the pouring spout 3, thus allowing fluid to be fully strained when deposited within the desired receptacle.

Still further embodiments of the invention other than the one herein especially defined may be resorted to as condition or preference may dictate, and may be in keeping with the hereto appended claims.

I claim:—

1. A strainer attachment for coffee and tea pots, comprising a blank of bendable sheet metal foldable to constitute perforated side walls and a solid top wall, means arranged upon said top wall engageable with one of said side walls whereby the perforate side walls and top may be maintained in folded position, and means arranged upon the marginal edges of said perforate side walls whereby the strainer may be attached to the pot interiorly thereof and adjacent the pouring spout.

2. A strainer attachment for coffee and tea pots, comprising a blank of bendable sheet metal, said blank being folded to constitute a V-shaped body having perforate side walls and an inclined top wall, a catch formed upon said top wall and engageable with one of said perforate side walls whereby the body will be held in folded position, a hooked engaging means formed upon the marginal edges of said side walls whereby the body may be attached to the pot interiorly thereof and adjacent the pouring spout, such inclined solid top wall serving as means for directing the fluid contents of the pot to the pouring spout.

In testimony whereof I affix my signature in presence of two witnesses.

ANNA M. ROSWELL.

Witnesses:
ALBERT J. YOUNG,
ROBERT P. SMITH.

Copies of this patent may be obtained for five cents each, by addressing the "Commissioner of Patents, Washington, D. C."